United States Patent [19]
Lemozit et al.

[11] Patent Number: 5,887,258
[45] Date of Patent: Mar. 23, 1999

[54] DEVICE FOR ALLOWING THE USE IN AN AIRCRAFT OF RADIO COMMUNICATION MEANS

[75] Inventors: Christian Lemozit, Pibrac; René Corbefin, Mondonville, both of France

[73] Assignee: Societe National Industrielle et Aerospatiale, Paris, France

[21] Appl. No.: 957,086

[22] Filed: Oct. 24, 1997

[30]     Foreign Application Priority Data

Oct. 28, 1996 [FR] France ................................. 96 13124

[51] Int. Cl.⁶ ........................................................ H04B 7/15
[52] U.S. Cl. ......................... 455/431; 455/528; 455/11.1; 455/575
[58] Field of Search .................................. 455/422, 426, 455/427, 431, 11.1, 12.1, 550, 552, 553, 557, 561, 562, 575, 528

[56]             References Cited

U.S. PATENT DOCUMENTS

| 5,450,471 | 9/1995 | Hanawa et al. . | |
| 5,535,430 | 7/1996 | Aoki et al. | 455/552 |
| 5,559,865 | 9/1996 | Gilhousen | 455/431 |

FOREIGN PATENT DOCUMENTS

| 0 559 187 A1 | 9/1993 | European Pat. Off. . | |

WO 94 28684  12/1994  WIPO .

OTHER PUBLICATIONS

Lipoff, S. "A Multipurpose Cordless Phone for Use in both Private and Public Systems", IEEE International Conference on Consumer Electronics, Digest of Technical Papers, Jun. 6–9, 1989, pp. 28–29 XP000075962.

International Search Report, 17 Jul. 1997, 3 pages.

*Primary Examiner*—Doris H. To
*Attorney, Agent, or Firm*—Marshall, O'Toole, Gerstein, Murray & Borun

[57]            ABSTRACT

The present invention relates to a device 1 for allowing the use in a aircraft A of at least one radio communication apparatus (R), such as mobile telephones. According to the invention, the radio communication apparatus (R) includes a first connection switch (MC1) between an information processing unit (2) and a transmit unit (3), and a connection switch (MC2) between the processing unit (2) and a receiving unit (5), and the device (1) includes a transmitter (8) transmitting waves (OE) out of the aircraft (A), a receiver (10) detecting waves outside the aircraft (A), and paths L1 and L2 respectively linked to the transmitter (8) and to the first connection switch (MC1) and to the receiver (10) and to the second connection switch (MC2).

10 Claims, 3 Drawing Sheets

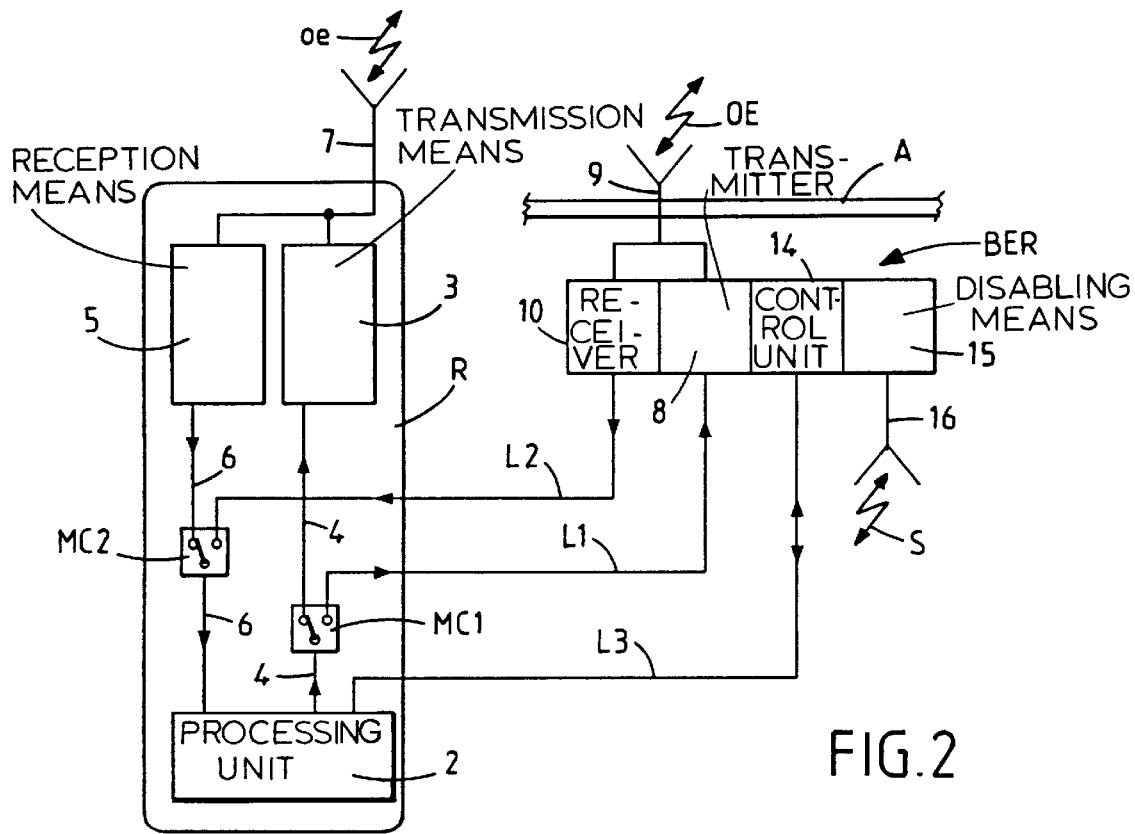
FIG.2
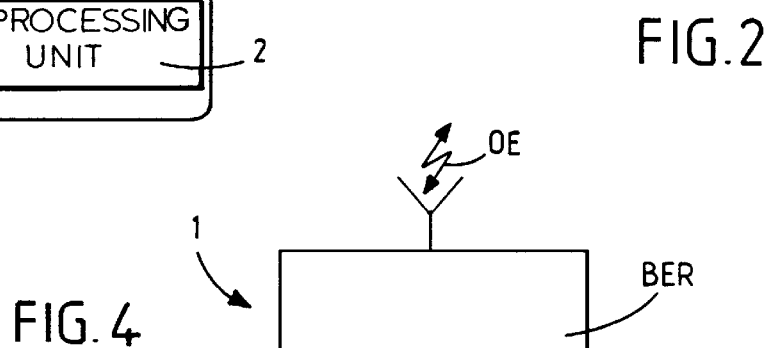
FIG.4
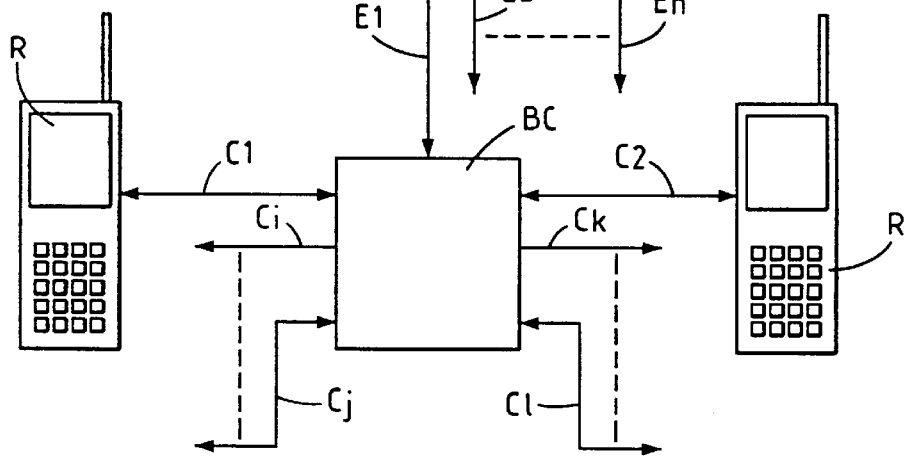

DEVICE FOR ALLOWING THE USE IN AN AIRCRAFT OF RADIO COMMUNICATION MEANS

BACKGROUND OF THE INVENTION

The present invention relates to a device for allowing the use in an aircraft of at least one personal means of radio communication, as well as to a means of radio communication designed for this purpose.

More precisely, the present invention applies to a personal means of radio communication which comprises in particular:

- a unit for processing digitized information;
- a means of transmission transmitting, in the form of electromagnetic waves, digitized information received from said processing unit; and
- a means of reception detecting, in the form of electromagnetic waves, digitized information which is sent to said processing unit.

Although the present invention is more especially appropriate for a mobile telephone, it can also be applied to other means of radio communication, such as for example portable computer terminals. In a known manner, such portable terminals make it possible to effect a computerized information communication, by virtue of their connection to computerized information networks with the aid of built-in radio modems.

It is known that mobile telephones, which have increased greatly in number in a short time, by virtue of low cost of acquisition and affordable price of communication, are barred from use on board aircraft, especially civil transport planes, for safety reasons. This bar is in fact necessary so as to avoid any electromagnetic interference with the on-board electronic systems of the aircraft, which is liable to be very damaging, in particular during aircraft takeoff and landing.

Also, when the passengers of a transport plane wish to communicate with their usual interlocutors, they must use the communication systems provided as the case may be for this purpose on the plane.

Thus, as regards for example telephone communications, special handsets with which planes are generally equipped are often made available to passengers, to allow them to call the subscribers of the terrestrial telephone network.

The radio means of communication implemented for this purpose use:
- either geostationary satellites;
- or installations provided on the ground and intended for air transport.

Furthermore, special installations have to be set up on the ground, so as to co-operate with these radio means of communication, and in particular so as to send the telephone communications to the persons called.

The aforesaid solutions are not satisfactory since they use complex and costly installations, which are intended as a priority for air transport, this entailing an extremely high communication cost.

Furthermore, these solutions have the following drawbacks:
- the means of communication which use ground installations have only limited geographical coverage. Furthermore, since several communication systems of different types exist, various appropriate items of equipment are necessary on the aircraft to obtain a satisfactory field of communication; and
- the means of communication which use geostationary satellites do not have worldwide coverage (for example, the polar regions are not covered) and the limited number of channels available reduces the communication capacities.

SUMMARY OF THE INVENTION

The object of the present invention is to remedy these drawbacks. It relates to a device for allowing the use in a simple and risk-free manner, in an aircraft of at least one personal means of radio communication of the type alluded to above, especially a mobile telephone.

For this purpose, according to the invention:

said means of radio communication furthermore includes;
- a first means of connection provided on the link between the processing unit and the transmission means and capable of being connected to a first means of sending digitized information so that, when the connection is established between said first means of connection and said first means of sending, the digitized information emanating from the processing unit is not sent to said means of transmission, but is conveyed by said first means of sending; and
- a second means of connection provided on the link between the processing unit and the reception means and capable of being connected to a second means of sending digitized information so that, when the connection is established between said second means of connection and said second means of sending, the digitized information emanating from the reception means is not sent to the processing unit, but digitized information can be conveyed by said second means of sending to said processing unit; and said device includes:
- a transmitter of electromagnetic waves capable of transmitting out of the aircraft, in the form of electromagnetic waves, digitized information received;
- a receiver of electromagnetic waves, capable of detecting outside the aircraft, in the form of electromagnetic waves, digitized information;
- said first means of sending linked to said transmitter and connected to said first means of connection; and
- said second means of sending linked to said receiver and connected to said second means of connection.

Thus, by virtue of the invention, any passenger of the aircraft can use a personal means of radio communication, for example a mobile telephone or a portable terminal, under the same conditions of service as if he were on land in his office or car, and can do so without danger of interference with the on-board electronic systems, since the action of the transmission and reception means of the relevant radio communication means is disabled during its use and since the transmitter of the device in accordance with the invention transmits out of the aircraft.

Furthermore, by virtue of said device in accordance with the invention, the owner of such a means of radio communication can not only call an opposite party, but also be called on his personal number, and under the same conditions as on the ground.

Moreover, advantageously:
- said transmitter and said receiver are integrated into a transmit and receive beacon; and/or
- said first and second means of sending form part of one and the same connection cable. Thus, the simple act of attaching this connection cable to the mobile telephone or the portable terminal disables the radioelectric part of the latter and prevents any untimely and dangerous electromagnetic transmission, inside the aircraft.

For reasons of ease of use, advantageously the free end of said connection cable, said end being intended to be linked simultaneously to said first and second means of connection, is accessible from a passenger seat of the aircraft.

Preferably, the aircraft includes connection cables in proximity to at least of plurality of passenger seats, as well as electrical supply means into which may be plugged on each occasion an electrical charging system of a personal means of radio communication.

Additionally, to allow the simultaneous use of a plurality of radio communication means, the device in accordance with the invention includes a plurality of pairs of first and second means of sending, respectively linked to said transmitter and to said receiver, each of said pairs of first and second means of sending being able to be connected to one of said radio communication means.

Moreover, so as to reduce the cabling and hence the cost of installation, the device in accordance with the invention furthermore includes several connection boxes, each of said connection boxes being linked, on the one hand, to the transmitter and to the receiver and, on the other hand, to a group of connection cables, in such a way as to allow a sending of digitized information between the transmitter and the receiver, and the radio communication means connected as the case may be to said connection cables.

Additionally, in a particularly advantageous embodiment of the invention, provision may be made for a means of disabling capable of transmitting inside the aircraft, in the form of electromagnetic waves, transmission inhibition commands, to a radio communication means when the latter is used directly without being plugged into said device.

The figures of the appended drawing will elucidate the manner in which the invention may be embodied. In these figures, identical references denote similar elements.

BRIEF DESCRIPTION OF THE DRAWINGS

FIG. 2 diagrammatically illustrates a personal means of radio communication linked to a device in accordance with the invention.

FIG. 4 shows a particular embodiment of a device in accordance with the invention.

DETAILED DESCRIPTION OF A PREFERRED EMBODIMENT

Figure 1:
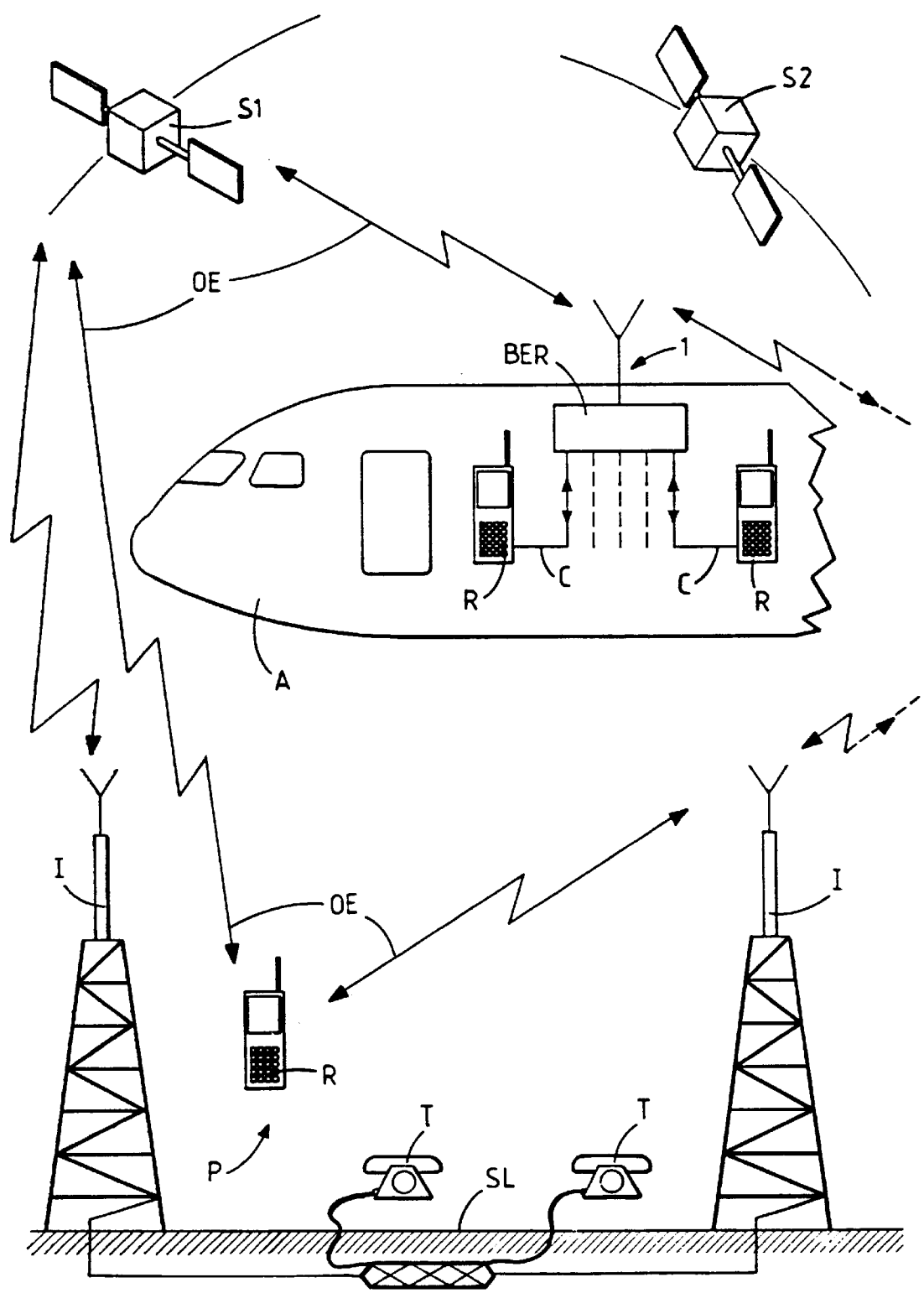
FIG. 1 illustrates the possible modes of communication from an aircraft, by means of a device in accordance with the invention.

The device 1 in accordance with the invention is intended to allow the passengers of an aircraft A especially a civil transport plane, to use a personal means of radio communication R, for example a mobile telephone or a portable computer terminal, to communicate with an opposite party located for example on the ground, such as represented diagrammatically in FIG. 1.

For this purpose, the electromagnetic waves OE transmitted with the aid of said device 1 from the aircraft A are conveyed, by way of a system of satellites S1 and S2 and/or of installations I provided on land, to this opposite party (not represented) who is located on the terrestrial telephone network (either on the cabled network, as illustrated by telephone sets T, or on the radio telephone network, as illustrated by a means of radio communication R at a point P on the ground SL).

The invention applies more particularly to a means of radio communication R, represented in the form of a mobile telephone in FIGS. 1 to 4, of the type comprising, as represented in FIG. 2:
- a unit 2 for processing digitized information;
- a means of transmission 3 capable of transmitting, in the form of electromagnetic waves oe, digitized information received by way of a link 4 from said processing unit 2; and
- a means of reception 5 capable of detecting, in the form of electromagnetic waves oe, digitized information which is sent to said processing unit 2 by way of a link 6.

Said means of transmission 3 and of reception 5 include a common antenna 7 which transmits and detects said electromagnetic waves oe.

It is known that the passengers of an aircraft A are prohibited from using such a means of radio communication R, in particular so as to avoid any electromagnetic interference with the on-board electronic systems of the aircraft A.

The object of the device 1 in accordance with the invention is to remedy this drawback. Furthermore, according to the invention, the radio communication means R described above is tailored so as to be able to be used on said device 1.

For this purpose, said radio communication means R furthermore includes, according to the invention, and as represented in FIG. 2:
- a means of connection MC1 provided on the link 4 between the processing unit 2 and the transmission means 3 and capable of being connected to a means L1, specified below, of sending digitized information so that, when the connection is established between said means of connection MC1 and said means of sending L1, the digitized information emanating from the processing unit 2 is not sent to said means of transmission 3, but is conveyed by said means of sending L1; and
- a means of connection MC2 provided on the link 6 between the processing unit 2 and the reception means 5 and capable of being connected to a means L2, likewise specified below, of sending digitized information so that, when the connection is established between said means of connection MC2 and said means of sending L2, the digitized information emanating from the reception means 5 is not sent to the processing unit 2, but digitized information, specified below, can be conveyed by said means of sending L2 to said processing unit 2.

Furthermore, to allow the use in the aircraft A of the radio communication means R having the aforesaid characteristics, the device 1 in accordance with the invention includes:
- a transmitter 8 of electromagnetic waves OE, linked to an antenna 9 set up outside the aircraft A and capable of transmitting out of the aircraft A, in the form of electromagnetic waves OE, digitized information received;
- a receiver 10 of electromagnetic waves, likewise linked to the antenna 9 and capable of detecting outside the aircraft A, in the form of electromagnetic waves OE, digitized information;
- said means of sending L1 linked to said transmitter 8 and connected to said means of connection MC1 during the use of the device 1; and
- said means of sending L2 linked to said receiver 10 and connected to said means of connection MC2, during the use of said device 1.

Thus, by virtue of said device 1:

the digitized information, emanating from the processing unit 2 and requiring to be transmitted, is not transmitted inside the aircraft A by the antenna 7 of the transmission means 3, but is transmitted outside said aircraft A by the antenna 9 of the transmitter 8; and the processing unit 2 receives information picked up outside the aircraft A by the receiver 10 and sent by the means of sending L2.

Thus, any danger of interference with the onboard electronic systems of the aircraft A is excluded.

The owner of such a radio communication means R linked to the device 1 can, consequently, call an opposite party or be called by an opposite party, who is on the terrestrial telephone network (cable network and/or radio telephone network), or who is furnished with an analogous radio communication means R and who is located:

in another aircraft likewise equipped with a device in accordance with the invention; or even in the same aircraft A.

Figure 3:
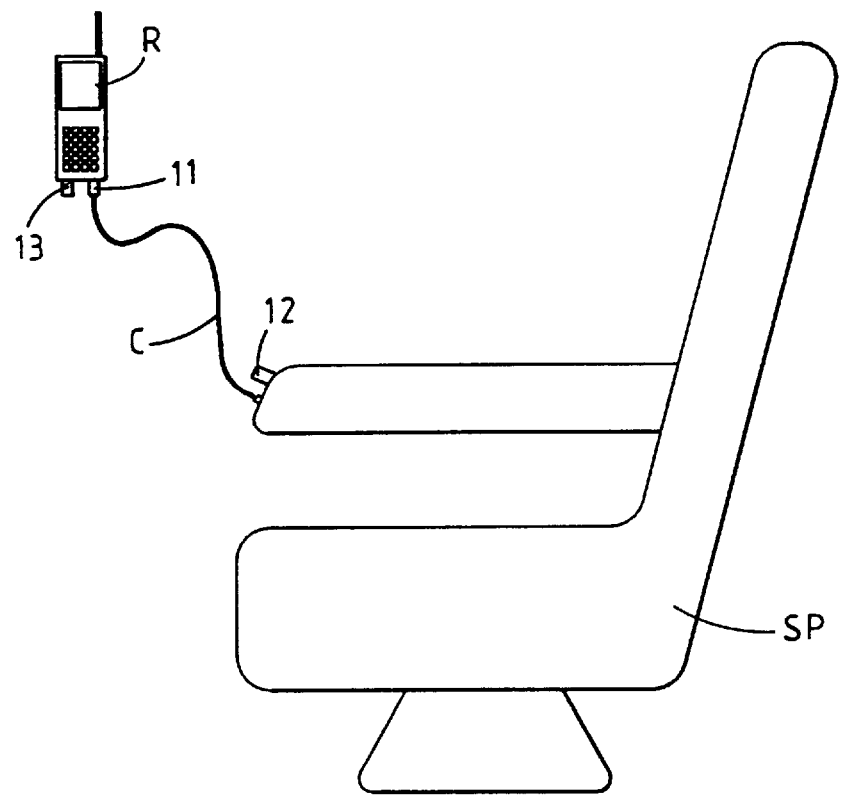
FIG. 3 shows elements of a device in accordance with the invention, which are installed in proximity to a passenger seat of the aircraft.

Preferably, according to the invention:

the transmitter 8, the receiver 10 and the antenna 9 are integrated into a transmission and reception beacon BER; and the means of sending L1 and L2 form part of one and the same connection cable C, as represented in FIG. 3.

Consequently, it suffices to attach this connection cable C to a connector 11 of the radio communication means R, preferably standard, provided for this purpose and linked simultaneously to the means of connection MC1 and MC2, so as to be able to use said radio communication means R and so as at the same time to disable any transmission by the means of transmission 3.

Furthermore, to allow a simultaneous use of a plurality of radio communication means R, the device 1 includes a plurality of connection cables C linked on each occasion to the transmission and reception beacon BER.

Preferably, these cables C to be connected to the radio communication means R are available in proximity to a plurality, or even to the totality, of the passenger seats SP of the aircraft A.

Furthermore, in proximity to each of said passenger seats SP, for example on the armrest or the foldaway table, it is possible to arrange an electrical supply means 12, for example a socket of the cigar-lighter type, into which may be plugged as the case may be an electrical charging system 13 of the radio communication means R, so as to effect the electrical charging of said radio communication means R.

Additionally, to reduce the size of the device 1 and in particular the length of the cabling, the device 1 includes, in a particularly advantageous embodiment represented diagrammatically in FIG. 4, a plurality of connection boxes BC, only one of which is represented in FIG. 4, which:

on the one hand, are respectively linked by way of links E1 to En to the transmission and reception beacon BER; and on the other hand, each includes a plurality of connection cables C1, C2, Ci, Cj, Ck and Cl, which are capable of being connected to radio communication means R.

This embodiment therefore makes it possible to reduce the length of the connection cables which are no longer linked directly to the beacon BER, but to the corresponding connection boxes BC, each of said connection boxes BC being provided for a group of passenger seats SP.

Additionally, the device 1 also includes, as represented in FIG. 2:

a control unit 14 which can be connected, by way of a double link L3 to the processing unit 2 of a radio communication means R, so as to control the operation of said device 1 and of said radio communication means R; and a disabling means 15 capable of transmitting, inside the aircraft A, by means of an antenna 16, in the form of low-power electromagnetic waves S transmission inhibition commands, to a radio communication means R, when the latter is used directly without being plugged into said device 1.

We claim:

1. A device for allowing the use in an aircraft (A) of at least one personal means of radio communication (R) comprising:

a unit (2) for processing digitized information;

a means of transmission (3) transmitting, in the form of electromagnetic waves (oe), digitized information received from said processing unit (2); and a means of reception (5) detecting, in the form of electromagnetic waves (oe), digitized information which is sent to said processing unit (2);

a first means of connection (MC1) provided on the link (4) between the processing unit (2) and the transmission means (3) and capable of being connected to a first means (L1) of sending digitized information so that, when the connection is established between said first means of connection (MC1) and said first means of sending (L1), the digitized information emanating from the processing unit (2) is not sent to said means of transmission (3), but is conveyed by said first means of sending (L1); and a second means of connection (MC2) provided on the link (6) between the processing unit (2) and the reception means (5) and capable of being connected to a second means (L2) of sending digitized information so that, when the connection is established between said second means of connection (MC2) and said second means of sending (L2), the digitized information emanating from the reception means (5) is not sent to the processing unit (2), but digitized information can be conveyed by said second means of sending (L2) to said processing unit (2)

said device (1) comprising:

a transmitter (8) of electromagnetic waves (OE) capable of transmitting out of the aircraft (A), in the form of electromagnetic waves (OE), digitized information received;

a receiver (10) of electromagnetic waves (OE), capable of detecting outside the aircraft (A), in the form of electromagnetic waves (OE), digitized information; and a means of disabling (15) capable of transmitting inside the aircraft (A), in the form of electromagnetic waves (S), transmission inhibition commands, to a radio communication means (R) when the latter is used directly without being plugged into said device (1), wherein said first means of sending (L1) is linked to said transmitter (8) and connected to said first means of connection (MC1), and wherein said second means of sending (L2) is linked to said receiver (10) and connected to said second means of connection (MC2).

2. The device as claimed in claim 1, wherein said transmitter (8) and said receiver (10) are integrated into a transmit and receive beacon (BER).

3. The device as claimed in claim 1, wherein said first and second means of sending (L1, L2) form part of one and the same connection cable (C).

4. The device as claimed in claim 3, wherein the free end of said connection cable (C), said end being intended to be linked simultaneously to said first and second means of connection (MC1, MC2), is accessible from a passenger seat (SP) of the aircraft (A).

5. The device as claimed in claim 3, wherein the device includes connection cables (C) in proximity to at least a plurality of passenger seats (SP) of the aircraft (A).

6. The device as claimed in claim 1, for a radio communication means (R) furnished with an electrical charging system (13), wherein said device includes a means of electrical supply (12) provided in proximity to a passenger seat (SP) of the aircraft (A), the electrical charging system (13) of the radio communication means (R) capable of being plugged into said electrical supply means (12).

7. The device as claimed in claim 6, wherein the device includes electrical supply means (12) in proximity to at least a plurality of passenger seats (SP) of the aircraft (A).

8. The device as claimed in claim 1 for allowing the simultaneous use of a plurality of radio communication means (R), wherein the device includes a plurality of pairs of first and second means of sending (L1, L2), respectively linked to said transmitter (8) and to said receiver (10), each of said pairs of first and second means of sending (L1, L2) being able to be connected to one of said radio communication means (R).

9. The device as claimed in claim 8, wherein the device includes several connection boxes (BC), each of said connection boxes (BC) being linked, on the one hand, to the transmitter (8) and to the receiver (10) and, on the other hand, to a group of connection cables (C1, C2, Ci, Cj, Ck, Cl), in such a way as to allow a sending of digitized information between the transmitter (8) and the receiver (10), and the radio communication means (R) connected as the case may be to said connection cables (C1, C2).

10. The device as claimed in claim 1 wherein said personal means of radio communications comprises a mobile telephone.

* * * * *

UNITED STATES PATENT AND TRADEMARK OFFICE
CERTIFICATE OF CORRECTION

PATENT NO. : 5,887,258
DATED : March 23, 1999
INVENTOR(S) : Lemozit et al.

It is certified that error appears in the above-identified patent and that said Letters Patent is hereby corrected as shown below:

On the title page, item [73], Assignee should be --Aerospatiale Societe Nationale Industrielle--

Signed and Sealed this

Seventeenth Day of August, 1999

Attest:

Q. TODD DICKINSON

Attesting Officer

Acting Commissioner of Patents and Trademarks